United States Patent [19]
Parker et al.

[11] Patent Number: 5,101,208
[45] Date of Patent: Mar. 31, 1992

[54] IFF AUTHENTICATION SYSTEM

[76] Inventors: Carlyle V. Parker, 7943 Bolling Dr., Alexandria, Va. 22308; John M. Hovey, 6533 Abbington Dr., Oxon Hill, Md. 20021

[21] Appl. No.: 619,122

[22] Filed: Feb. 24, 1967

[51] Int. Cl.5 ............................................. G01S 13/78
[52] U.S. Cl. ................................... 342/45; 342/50
[58] Field of Search ............ 343/6.5 R, 6.5 LC, 6.8 R, 343/6.8 LC; 342/42, 45, 50

[56] References Cited

U.S. PATENT DOCUMENTS

| | | | |
|---|---|---|---|
| 2,796,602 | 6/1957 | Hess et al. | 343/6.5 LC |
| 3,167,772 | 1/1965 | Bagnall, Jr. et al. | 343/6.5 LC X |
| 3,262,111 | 7/1966 | Graham | 343/6.5 LC X |
| 3,281,839 | 10/1966 | Triest et al. | 343/5 DP |
| 3,336,591 | 8/1967 | Michnik et al. | 343/6.5 LC |
| 3,412,399 | 11/1968 | Chisholm | 343/6.5 LC |
| 3,750,163 | 7/1973 | Hecker | 343/6.8 R X |
| 3,860,922 | 1/1975 | Wagner | 342/45 X |
| 3,900,867 | 8/1975 | Wagner | 342/45 |
| 3,945,006 | 3/1976 | Cleeton | 342/45 |
| 3,949,397 | 4/1976 | Wagner et al. | 342/45 |
| 4,024,538 | 5/1977 | Bishop | 342/45 |
| 4,194,201 | 3/1980 | Stein | 342/45 |
| 4,322,729 | 3/1982 | Honold et al. | 342/45 |
| 4,862,176 | 8/1989 | Voles | 342/45 |
| 5,001,751 | 3/1991 | Sanford et al. | 342/45 X |

Primary Examiner—T. H. Tubbesing

[57] ABSTRACT

The device is an IFF Authentication System for sending and receiving of coded intelligence. So as to reduce an alien's chances of using the intelligence transmitted, the system uses a clock to provide signals for additional encipherment or scrambling of the coded intelligence. The clock is easily synchronized and provides continuously changing code encipherment for maximum protection and is connected into the system at a variety of predetermined places depending on the componential design of the particular system being used.

22 Claims, 6 Drawing Sheets

IFF AUTHENTICATION SYSTEM

FIELD OF THE INVENTION

The present invention relates to an improved IFF Authentication System for use in connection with IFF Systems having the ability to reduce the probability of an alien deceiving the user to appear as a friend, as well as preventing gainful use of our IFF System by the alien at our expense.

DESCRIPTION OF THE PRIOR ART

IFF Systems are used in the identification of friendly aircraft, and an important consideration in the design of the System is the prevention of an alien from making use of our IFF System for his own purpose as for example, early warning of the approach of our aircraft, and, or for tracking them by weapon control units. Obviously, one solution to this problem is to turn off transponder equipment in the vehicle. Deficiency in this technique results because of the possibility of forgetting to turn the units back on again at the proper times.

In prior systems where the intelligence transmitted and received has been in the form of coded bits (usually cryptographic in nature), the system after being initially coded and placed in operation, was subject to an alien's attempts during a relatively short period of time to store and repeat codes so as to effectively use such intelligence to his advantage.

As a means of preventing any alien from utilizing the intelligence transmitted, thereby enhancing the usefulness and life of the basic IFF System, this system uses a unique technique of enciphering conventionally coded intelligence beyond the degree provided by past IFF Systems, while maintaining maximum accuracy of code matching between the Interrogator-Transponder Units through the use of related auxiliary time synchronization circuitry.

SUMMARY OF THE INVENTION

The general purpose of this invention is to provide an improved IFF Authentication System characterized by low-cost, positive means of obtaining tactical information about friendly aircraft, as well as preventing an alien from interrogating the system without knowledge of the friend, hence providing useful information for the alien at the expense of the friend. Basically the system comprise an Interrogator Unit and a Transponder Unit, the latter of which will usually be located in the aircraft or other vehicle about which information is being sought. The Interrogator Unit is comprised of a computer for processing the coded intelligence transmitted and is connected by an input and output means to a transceiver for transmitting the intelligence supplied thereto, as well as receiving related intelligence from the Transponder Unit. In addition to its normal encipherment, the Interrogator computer is externally coded at an input by precision clock circuitry shown to include an auxiliary synchronization circuit, the latter of which is connected to the video input of the Interrogator computer to provide maximum code synchronization between the Interrogator Unit and the Transponder Unit. The Transponder Unit is comprised of a similar computer connected to a transceiver by video output means. This transceiver will receive the signals transmitted from the Interrogator transceiver and process them through the Transponder computer to provide an intelligence signal in proportion thereto for transmission back to the Interrogator Unit. The Transponder Unit is also provided with a precision clock and auxiliary synchronization circuit serving substantially the same purpose as corresponding circuitry in an Interrogator Unit. A major difference in the design of the Transponder Unit to that of the Interrogator Unit is the use of a response limiter connected between the computer and video input of the transceiver, acting to reduce the probability of an alien receiving a useful number of replies to random interrogations. Although the Interrogator Unit of the System is similar in design to that of the corresponding Transponder Unit several other differences are necessary because of the different function of each, namely, the former provides a challenge that consists of an enciphered word which the Transponder deciphers by using an operation that is the reverse of that used by the Interrogator.

Several embodiments of the basic invention are shown to illustrate the fact that there are numerous ways of enciphering the digitized information provided by the precision time clock into the intelligence transmitted. These modifications are direct outgrowths of two major limiting factors, namely, restricted computer flexibility and necessity of code variety for maximum security against alien utilization. Regarding the former, only computers already available, as opposed to newly designed computers, are utilized so as to keep down the cost of each system. Thus, it becomes necessary to design the precision clock auxiliary synchronization circuitry to meet the needs of the particular computer utilized. Concerning the second factor, obviously the greater the variation in coded encipherment, the less likelihood of success an alien will have to effectively use the intelligence transmitted by the system.

An object of the present invention is to provide an IFF Authentication System for positively identifying vehicles.

Another object of the present invention is the provision of an IFF Authentication System for enabling a friend to positively identify aircraft, while virtually eliminating the possibility of an alien utilizing the system for tracking or homing purposes.

Still another object of the present invention is the provision of an IFF Authentication System for positively identifying aircraft using coded intelligence as the signaling means.

Still another object of the present invention is the provision of a low-cost, highly accurate IFF Authentication System using a precision clock as the partial source of the coded intelligence transmitted.

Yet another object of the present invention is the provision of an IFF Authentication System using a time-controlled auxiliary synchronization circuit to provide maximum authentication of signals between the units used.

Another object of the present invention is the provision of an IFF Authentication System having an Interrogator and a Transponder Unit, both of which use precision clocks as a partial means for coding the intelligence transmitted, as well as an auxiliary synchronization circuitry to provide maximum code synchronization between the units, the Transponder Unit utilizing a response limiter as further deterrent to unauthorized enemy use of our system.

DESCRIPTION OF THE PREFERRED EMBODIMENTS

Figure 1:
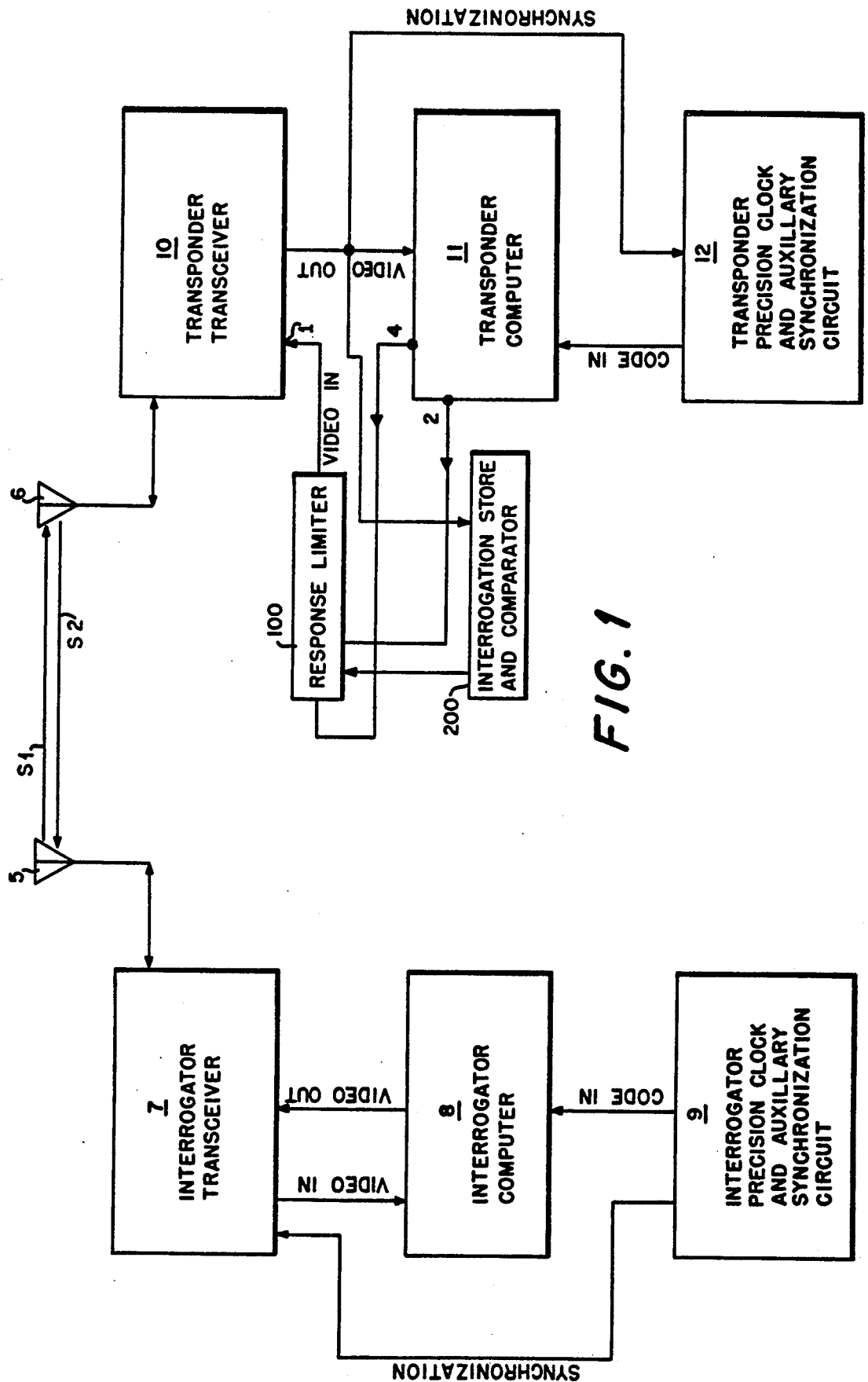
FIG. 1 shows a block diagram of the basic system.

Turning now to FIG. 1 where a basic block diagram of the system is shown, transceiver 7 (located either on the ground or in the air) has an antenna 5 for transmission of intelligence. A computer 8 is connected by a video output of the transceiver for processing coded intelligence programmed into the computer by internal and external code means. The internally coded intelligence is not shown in the drawing, while the external intelligence is provided by the precision clock shown within block 9 and is coded into computer 8 and enciphered with the internally coded intelligence and subsequently transmitted to the video out into transceiver 7 for transmission. Also shown as within block 9 is an auxiliary synchronization circuit connected from the output of the clock in block 9 to an input of transceiver 7. A similarly arranged unit is provided as the transponder portion of the system including a transceiver 10 having an antenna 6 for receiving intelligence transmitted thereto. The computer 11 processes the coded intelligence from the predetermined program within the computer with the digital intelligence from the precision clock 12. Block diagram 12 also includes the auxiliary synchronization circuit and is connected by a lead from the video output of transceiver 10 to an input of block 12. An important feature of this portion of the system is the response limiter 100 connected to the video input terminal 1 and two other terminals 2 and 4, the latter two being outputs from the computer 11. Basically the response limiter 100 provides further protection against the probability of an enemy utilizing our system for his own purposes and is discussed in more detail in connection with FIG. 4.

Figure 2:
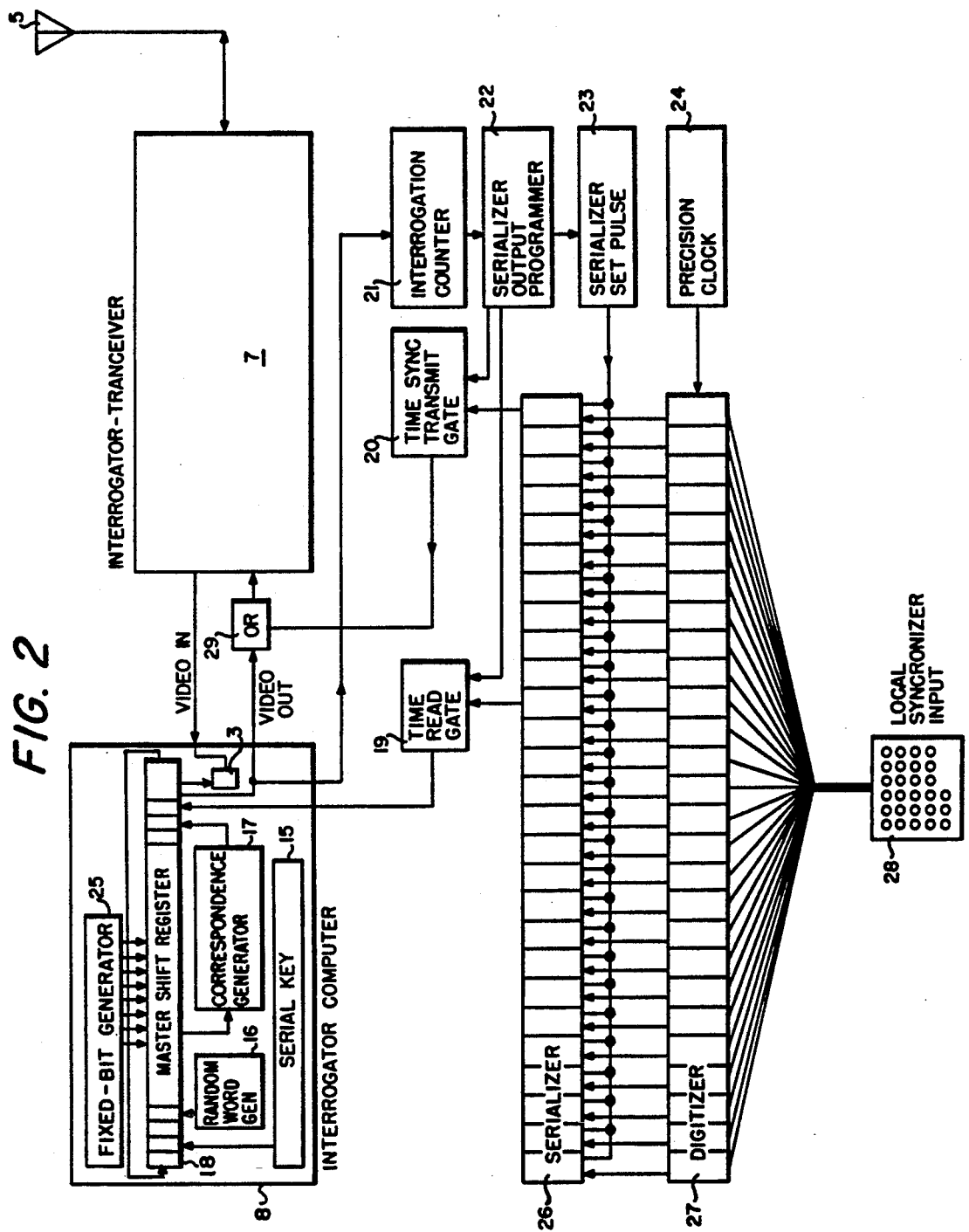
FIG. 2 shows a more detailed block diagram of a particular embodiment of the Interrogator Unit of the system.

Referring to FIG. 2, a more detailed block diagram of one arrangement of the basic system is shown including a computer 8 connected to the transceiver 7 by a video input connected to a responser 3 and video output lead connected from master shift register 18. Antenna 5 is connected to the output of transceiver 7 for transmission and reception of intelligence transmitted therethrough. Although other components are in the computer 8 only those necessary in illustrating the basic invention are shown. The master shift register 18 acts to receive the coded intelligence from the different sources, namely, the serial key 15, the random word generator 16, and the coded information from the time read gate 19. The serial key 15 may be any selected coded word inserted into the computer and is fixed until such time as it is replaced by a new word. The random word generator is a source of binary intelligence acting to generate a random word for insertion into the master shift register 18.

Under normal operation the time of day in binary format is continuously maintained in digitizer 27. This digitizer may be a 27-stage binary counter which counts regularly spaced time signals from precision clock 24.

The time setting of digitizer 27 may be corrected by plugging a local time standard into local synchronizer input 28. This local time standard would supply the correct time of day in 27-bit binary form in parallel to the 27 stages of digitizer 27 and thereby set this digitizer to the proper time. After the local time standard is unplugged from input 28 the time reading in digitizer 27 will be maintained current by counting the time signals emitted by clock 24.

The output from digitizer 27 is then parallel fed into serializer 26 under the command of serializer set pulse 23. This block 23 furnishes a signal once for each interrogation cycle to control the parallel transfer of data from digitizer 27 to serializer 26 and this transfer process is repeated with each interrogation cycle so that a current time word is always available in serializer 26 to be serially passed through time read gate 19 under the control of signals from serializer output programmer 22. As can be seen from FIG. 2 only the 17 most significant bits of the time word are passed serially through time read gate 19 and then modulo-2 added to the word in master shift register 18.

Interrogation counter 21 is used to count interrogations. The first fifteen (15) consecutive interrogations result in an output to the serializer output programmer 22 that cause the time of day from serializer 26 to be added to the master shift register 18 through time read gate 19. Each 16 interrogations sensed by counter 21 causes the time synchronization transmit gate 20 to appear just prior to the normal interrogation resulting in the time of day being read from the serializer 26 through OR-circuit 29 for transmission by transceiver 7 immediately prior to the normal interrogation.

Figure 3:
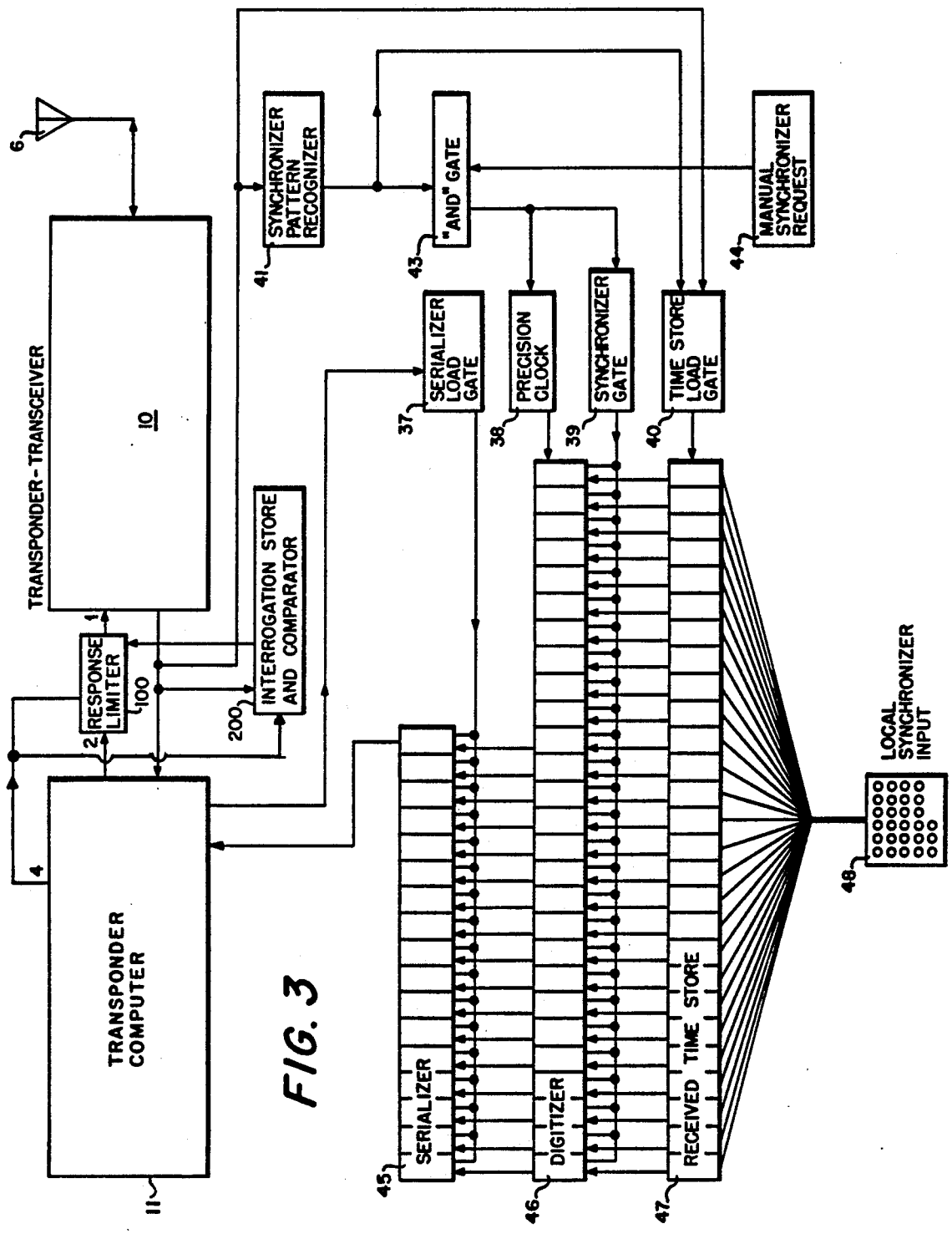
FIG. 3 shows a detailed block diagram of the corresponding Transponder Unit to the unit in FIG. 2.

FIG. 3 shows the Transponder Unit of the Authentication Systems used with the particular Interrogator Unit shown in FIG. 2 discussed above. A local synchronizer input 48 is connected parallel to a received time store 47. The output from the store 47 is fed in parallel to a "27 bit" digitize 46 and then to serializer 45 under the control of load gate 37. The precision clock 38 output is serially counted into the "27 bit" digitizer 46. Since the Transponder Unit is usually located in an aircraft or at other inaccessible locations, an alternate means of timing is provided by either the Interrogator Unit time or some other source having the correct time, such as another Transponder Unit. As a means of timing the Transponder Unit from a remote time standard, a manual synchronizer request 44 is provided so that an operator may initiate a request for synchronization to a received time synchronization signal. When the request is made the synchronization pattern recognizer 41 scans the received video, and upon recognition of a time synchronization signal, will open synchronization gate 39 and time store load gate 40 allowing the received time signal to be stored for use in the Transponder Unit. Computer 11 in the Transponder Unit receives input from the serializer 45 and deciphers information initiated in the Interrogator Unit. Transceiver 10 has an antenna 6 and is connected by a video output to computer 11. The video input from the computer has a response limiter 100 connected between it and transceiver 10 at terminals 2 and 1, respectively. The response limiter 100 is also connected to the computer 11 by lead 4 and is a logic circuit arrangement providing a means of reducing the probability of alien's affective use of the intelligence transmitted to his own advantage to be more fully explained in connection with FIG. 4 below.

Figure 4:
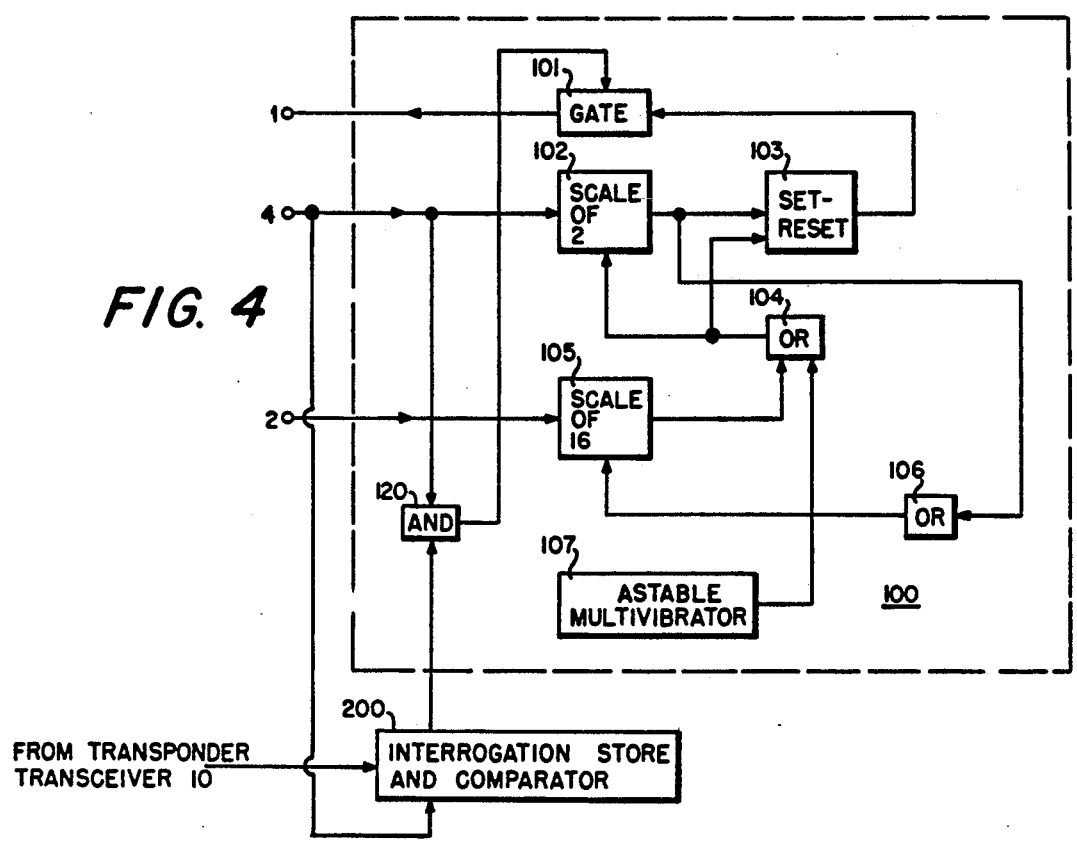
FIG. 4 shows the logic circuitry of the response limiter.

FIG. 4 is the logic circuit block diagram of the response limiter 100 used in connection with Transponder Unit of the system. The primary purpose of response limited 100, as previously mentioned, is to reduce an alien's probability of successful utilization of the intelligence transmitted in the system. For example, one pulse is applied at input terminal 4 whenever a proper interrogation is received and the response limiter 100 is arranged so that at least two proper interrogations must be received before the Transponder Unit gives a reply. In addition it is required that the two proper interrogations differ from each other in at least one bit so that an alien may not obtain a reply by sending the same interrogation twice. To make this check on proper interrogations, the first is temporarily stored in interrogation store and comparator 200 in response to signal 4, and therein compared with the next succeeding proper interrogation also in response to signal 4. If the two proper interrogations differ by at least one bit, a signal is sent to one of the inputs of AND gate 120 which must be enabled before any reply is transmitted. The other input of AND gate 120 is connected to terminal 4 so that when the second proper interrogation arrives (differing from the earlier stored interrogation), a signal is passed to the output of gate 120.

Counter 102 is a flip-flop circuit and when two pulses appear at terminal 4, block 102 sets flip-flop 103 such that gate 101 is gated "on". Hence gate 101 will successful pass a signal arriving from AND gate 120 and a reply will be sent by the transponder. In the "off" gate position of gate 101 no reply will be given even to a correct interrogation.

Besides requiring the reception of two proper interrogations before allowing a reply, response limiter 100 also counts the number of improper interrogations (i.e. those which fail to pass a fixed-bit comparator test) received and prevents a reply when this number exceeds a predetermined amount. This counting is done by scale of 16 counter 105 which receives a pulse at terminal 2 whenever an improper interrogation is received. Such a pulse may appear at the output of the respective computer as a disparity pulse, and when a predetermined number of such pulses has appeared at terminal 2, block 105 produces an output which resets the flip-flops 102 and 103 to a zero position thereby returning gate 101 to its "off" position thereby preventing the Transponder Unit from replying to false interrogations. An astable multivibrator circuit 107 provides a periodic pulse which also acts to reset flip-flops 102 and 103. This provision insures that a count left over in the flip-flop from a friendly interrogation does not remain indefinitely to assist an alien in getting a reply. Scale of 16 counter 105 is reset to zero whenever counter 102 emits a signal.

FIGS. 5 through 9 show alternate means of enciphering the coded time from the precision clock into the intelligence transmitted by the Authentication System. Each of the Figs. contain only the elements necessary to illustrate the particular scheme of connecting the coded information from the precision clock into the intelligence transmitted and are not intended to be fully comprehensive of the entire system as other minor technical modifications may be necessary to accomodate the components in connection with the particular arrangement. Furthermore, in each of the Figs. the circuitry illustrated is that used in connection with the Interrogator Unit of this system with the understanding that similarly arranged circuitry will be used in the Transponder Unit to provide the corresponding means of deciphering the intelligence transmitted.

Figure 5:
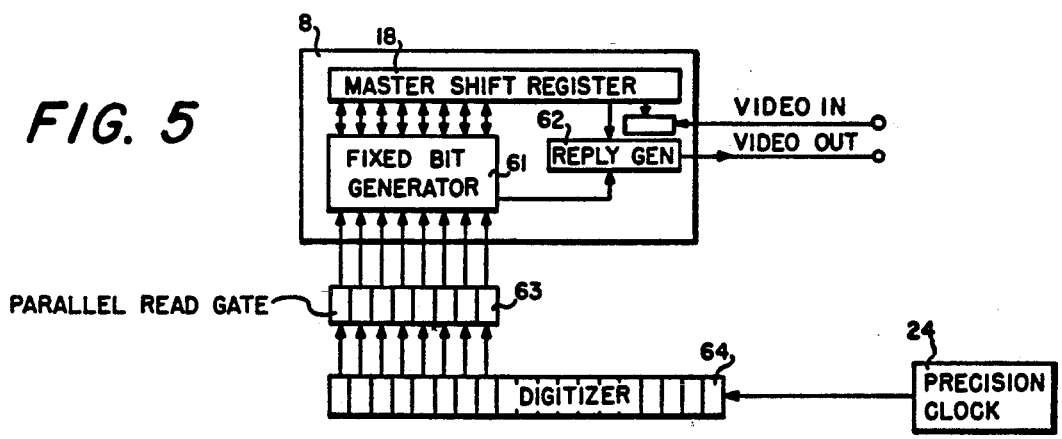
FIGS. 5 through 9 show embodiments illustrating the various methods of adding coded intelligence from the precision clock to the encipherment.
Figure 6:
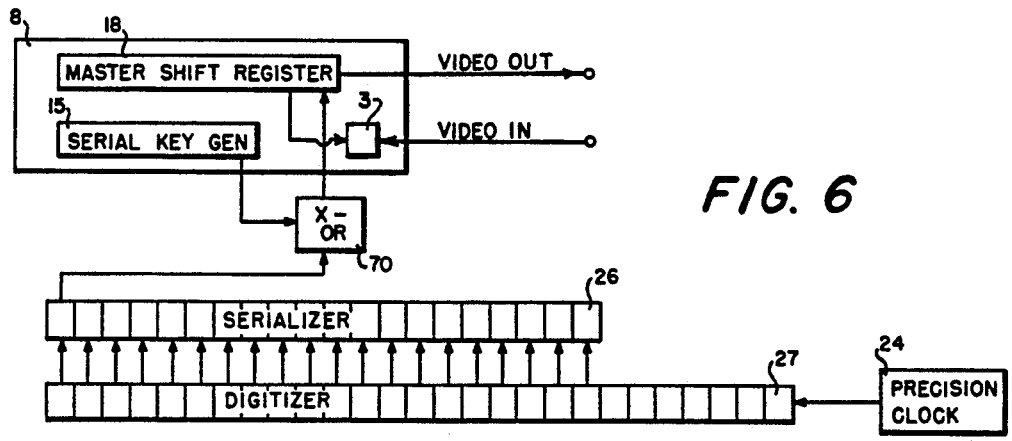

In FIG. 5 the computer 8, having a video input and a video output, is shown to include a master shift register 18 fed by a fixed-bit generator 61. The reply generator 62 is connected to an output of the fixed-bit generator 61 and the master shift register 18. In this embodiment of the invention the digitized intelligence from the precision clock 24 is serially fed into a digitizer 64 having, for example, "8 bits" of its output fed in parallel into the read gate 63 whose output is in turn fed into the fixed-bit generator 61, thereby providing a direct encipherment of the digitized time into the fixed-bit control circuit.

FIG. 6 shows a computer 8 again having a video input and video output, and a master shift register 18. The serial key generator 15 is connected to an exclusive-OR circuit 70 whose output is in turn connected to the master shift register 18 for encipherment of the coded information applied thereto. The digitized coded intelligence from precision clock 24 is serially fed into digitizer 27, the latter having its first seventeen digital outputs fed parallel into a serializer 26 whose output is fed serially into an input of the exclusive-OR circuit for encipherment of the digitized time into the serial key generator 15.

Figure 7:
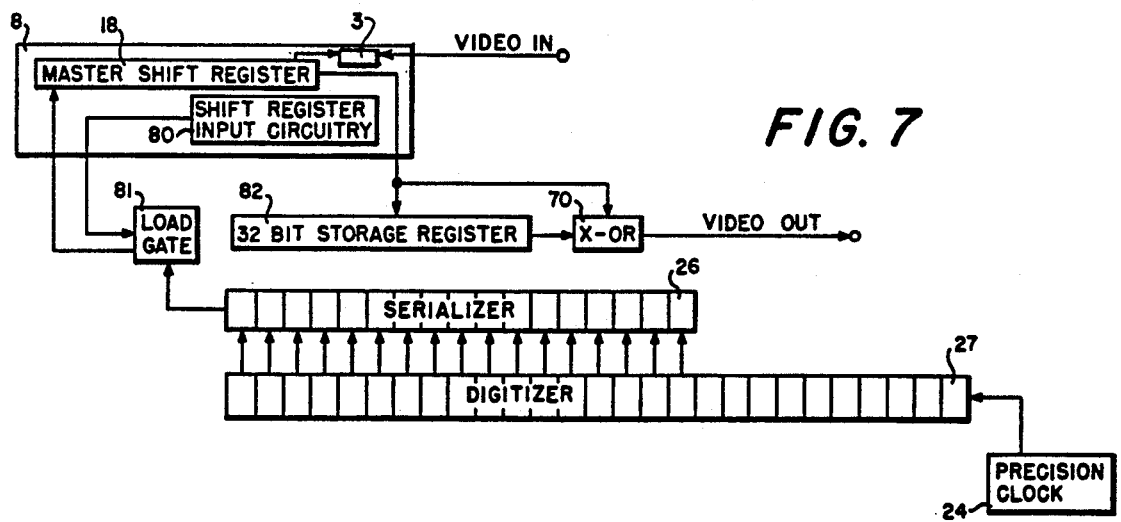

FIG. 7 shows another embodiment for incorporating time in the interrogation signal. This figure shows the type of circuitry required to provide interrogations in which the time of day is enciphered and then modulo-2 added to a normally enciphered interrogation from 80 at the time of its transmission. In this embodiment seventeen bits are again used to represent time, thus providing a single discrete word to represent each second of the day. This seventeen bit word along with fifteen bits of its complement are loaded into master shift register 18 and enciphered once each second. This enciphered time word is then stored in thirty-two bit storage register 82 and added serially, modulo-2, to each normal interrogation transmitted. The transponder (not shown) for this embodiment also maintains a thirty-two stage register containing the current time of day which has been enciphered by the transponder computer.

Figure 8:
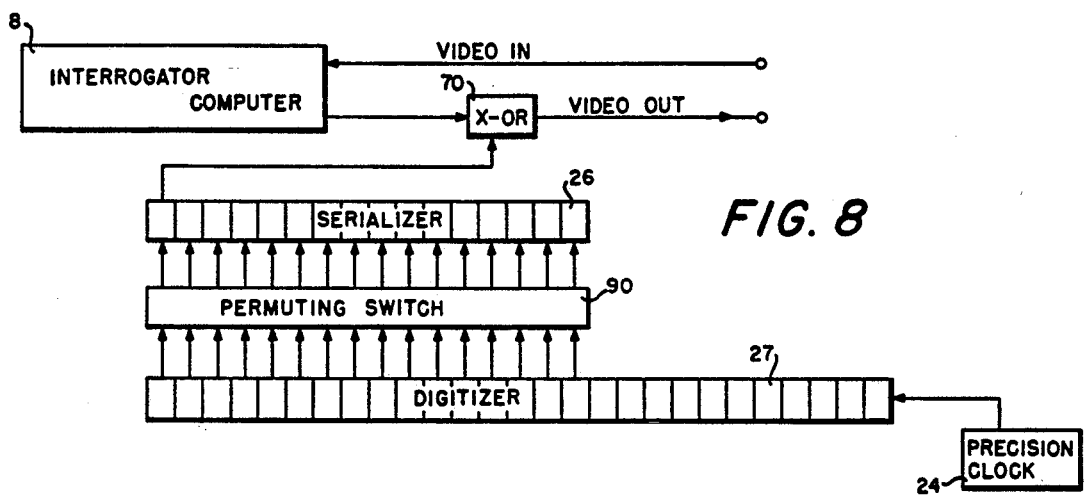

FIG. 8 shows the computer 8 having a video input and an output connected to an exclusive-OR circuit 70 to form the video output, such that the digitized time code from precision clock 24 after being serially fed into the digitizer 27, is fed in parallel to the input of permuting switch 90 having its outputs fed parallel into serializer 26, the latter having its digital output serially connected to the exclusive-OR circuit to provide the intelligence transmitted to the video output with an enciphered code based on the time of day. This arrangement has the advantage of requiring no modification to the computer although, a disadvantage is encountered in that the daily code must be provided for the permuter to prevent an alien from determining a valid set of interrogations.

Figure 9:
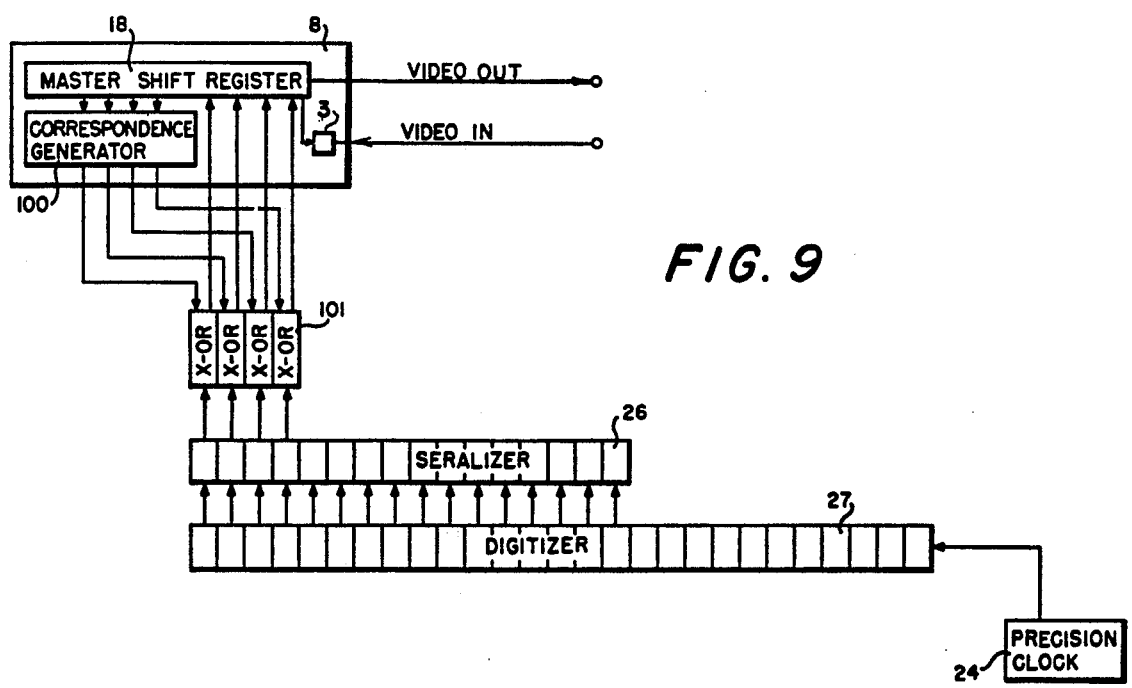

FIG. 9 shows another embodiment of the basic system offering maximum protection against the probability of an alien using the intelligence transmitted to his own advantage and/or to the disadvantage of the user. In this arrangement the computer 8 having the video input and output is shown to have a master shift register 18 and a correspondence generator 100, the latter of whose output is connected to a respective one of four exclusive-OR circuits indicated by reference number 101. Four bits at a time are read out of serializer 26 for modulo-2 addition at each read out of the correspondence generator back into master shift register 18 during the encipherment of an interrogation. This operation may be carried out in various ways. For example, after reading out the first four bits, serializer 26 may be shifted four bits to the left so that the next four bits may then be read out to exclusive-OR gates 101. This 4-bit shifting could be continued and, since there are an odd number (17) of bits in the time of day code, seventeen such 4-bit shifts would utilize the 17 bits taken four at a time in 17 unique combinations. Alternatively, serializer 26 could shift one bit at a time and the read out exclusive-OR gates 101 could occur after each 1-bit shift.

Thus, the system provides an improved IFF Authentication System having an Interrogator and a Transponder Unit each using a precision clock in connection therewith as the means for providing additional code encipherment so as to reduce an alien's probability of successful decipherment of the intelligence transmitted. The clock is also used in conjunction with auxiliary synchronization circuitry to provide synchronization between the Interrogator and Transponder Units for insuring maximum overall accuracy of intelligence signals transmitted in the system. In order to further reduce the probability of unauthorized code decipherment, the system uses a logic circuit arrangement in connection with the Transponder Unit.

A typical operation of the system will now be given starting with the transmission of an interrogation and ending with a reply. In response to a radar signal or other type of signal a trigger is sent to the IFF system to start an interrogation operation. This begins by allowing random word generator 16 (in FIG. 2) to serially load 24 random bits into master shift register 18. Also eight fixed-bits from the Fixed-Bit Generator are entered in parallel into the register and the encipherment cycle begins. Master shift register 18 feeds back into itself so that the bits leaving the right hand (or 32nd) stage in FIG. 2 are automatically fed into the left hand (or 1st) stage of the shift register. While the information is circulating in the register it is altered by correspondence generator 17. This generator accepts bits from one or more of the shift register stages and adds them, modulo-2, to the bits in one or more of the other stages. The 32 bit serial key (from block 15) is also added modulo-2 bit by bit to the contents of the MSR (master shift register) as each step of the encipherment cycle takes place. In addition 17 bits of the time of day word are fed from serializer 26, through time read gate 19, and added modulo-2 to the MSR contents in a similar manner.

The resultant interrogation signal is then transmitted from antenna 5 to be received by the transponder of FIG. 3. This transponder includes a transponder-computer which receives the interrogation signal and processes it (in a manner opposite to that of the original encipherment) to recover the original 8 fixed bits. These fixed bits are compared in a fixed-bit comparator with a locally stored group of fixed-bits and if a match is obtained the scale of 2 counter 102 in FIG. 4 receives a pulse via terminal 4. No reply is generated as yet because two proper interrogations are necessary before a signal appears at terminal 1 of response limiter 100. This first interrogation is temporarily stored in interrogation store and comparator 200. When a second proper interrogation is received, the two are compared and, if they differ in at least one bit, a signal is transmitted from the comparator in block 200 to AND gate 120. This AND gate in turn opens to pass a signal to terminal 1 which initiates the transmission of a reply signal. This reply signal is based on the originally transmitted random bits from 18 so that the interrogator can check the reply to see that it is valid in responsor 3.

As explained earlier the response limiter also counts improper interrogations and prevents a reply if a given number of these are received.

The operational methods for synchronization of airborne transponder clocks are of two types: (1) manual synchronization of the time setting with a local time standard before take off of the airplane by means of a small plug-in device, and (2) synchronization at a distance by means of special timing interrogations which would be radiated by every interrogator on a time-sharing basis with, say, one timing interrogation for every 16 normal interrogations. These special timing interrogations would include a group of pulses which tag them as special timing interrogations and the time itself would be transmitted in 27 pulse positions to give the time of day to approximately one millisecond. This operation can be carried out by the station shown in FIG. 2. The interrogation counter 21 counts sixteen interrogations and then serializer output programmer 22 opens time sync transmit gate 20 to pass the 27 time bits to the interrogator-transceiver. These special timing interrogations are recognized by the synchronizer pattern recognizer 41 at a transponder such as is shown in FIG. 3 and the time reading at this transponder is brought in to synchronization.

It should be understood, of course, that the foregoing disclosure relates to only preferred embodiments of the invention and that numerous modifications or alterations may be made therein without departing from the spirit and the scope of the invention as set forth in the appended claims.

What is claimed and desired to be secured by Letters Patent of the United States is:

1. An authenticating interrogation system comprising:
    a first tranceiver for transmitting and receiving coded intelligence signals related to the tracking and location of friendly aircraft;
    a second transceiver for receiving coded intelligence emanating from said first transceiver and transmitting coded reply signals;
    a means associated with each of said transceivers for processing in accordance with a predetermined code a body of intelligence generated from sources of intelligence, each of said means for processing including several sources of intelligence, a master shift register acting to receive the coded intelligence from said several sources of intelligence, and a correspondence generator connected to receive information from at least one stage of said master shift register and deliver said information thus received to at least one other stage of said master shift register; and
    means for periodically changing said body of intelligence operatively associated with the respective transceiver so as to prevent an unauthorized operator from using the coded intelligence to his advantage, said means also providing maximum synchronization between said transceiver units for precision code recognition.

2. The system defined in claim 1 wherein said information delivered by said correspondence generator is modulo-2 added to said other stage of said master shift register.

3. The system defined in claim 2, further including:
a response limiter connected between said second transceiver and said means for processing said body of intelligence associated therewith for further reducing the probability of an alien's successful utilization of the coded intelligence transmitted.

4. The system defined in claim 2, wherein:
the means for periodically changing said coded source of intelligence is a precision clock.

5. The system defined in claim 1, further including:
a response limiter connected between said second transceiver and said means for processing said body of intelligence associated therewith for further reducing the probability of an alien's successful utilization of the coded intelligence transmitted.

6. The system defined in claim 1, wherein:
the means for periodically changing said coded source of intelligence is a precision clock.

7. An authenticating interrogation system comprising:
an interrogating means for processing a first body of intelligence and generating a plurality of coded interrogation signals;
a first transceiver means coupled to said interrogating means for transmitting said coded interrogation signals and receiving coded reply signals;
a second transceiver means for receiving said transmitted coded interrogation signals and transmitting said coded reply signals;
a transponder means coupled to said second transceiver means for decoding said coded interrogation signals in response to a second body of intelligence and generating said coded reply signals;
response limiter means for coupling said coded reply signals to said second transceiver only after a plurality of correctly coded interrogation signals have been received from said interrogating means;
means for timing and periodically changing said first body of intelligence; and
means for periodically changing said second body of intelligence in synchronism with said first body of intelligence.

8. The system of claim 7 wherein said means for timing comprises, a first clock coupled to change said first body of intelligence, means for counting the number of coded interrogation signals transmitted, and means responsive to a predetermined count in said counting means for coupling a timing signal for transmission by said first transceiver means.

9. The system of claim 8 wherein said means for periodically changing said second body of intelligence comprises, a second clock coupled to change said second body of intelligence and a means responsive to said transmitted timing signal for synchronizing said second clock with said first clock.

10. The system of claim 7 wherein said interrogating means comprises, a plurality of intelligence sources coupled to provide said first body of intelligence, a master shift register coupled to receive the intelligence from said plurality of sources, and means coupled to said master shift register for providing said coded interrogation signals in response to said first body of intelligence.

11. The system of claim 10 wherein said means for periodically changing said first body of intelligence includes a precision clock.

12. The system of claim 11 wherein said means for periodically changing said first body of intelligence further includes, a multibit digitizer coupled to serially receive signals from said precision clock and provide coding output signals, and a local synchronizer input coupled to said digitizer to receive time signals from a standard source of time when said standard source is plugged into said local synchronizer input.

13. The system of claim 12 wherein said interrogating means further includes, a fixed-bit generator having a plurality of outputs forming one of said plurality of intelligence sources, said fixed-bit generator outputs being coupled in parallel into said master shift register for coding said first body of intelligence.

14. The system of claim 13 further including means for modulo-2 adding the coding signals from said digitizer with the intelligence in said master shift register.

15. The system of claim 13 wherein said digitizer is coupled to provide said coding output signals as input to said fixed-bit generator and wherein said means for providing said coded interrogation signals comprises a reply generator coupled to receive outputs from said fixed-bit generator and said master shift register to form said coded interrogation signals.

16. The system of claim 12 wherein said interrogating means further includes means for modulo-2 adding the coding output signals from said digitizer with intelligence from one of said plural sources of intelligence annd coupling the summed output to said master shift register as part of said first body of intelligence.

17. The system of claim 12 wherein said interrogating means further includes, a load-gate coupled to receive input from one of said plurality of intelligence sources during a first time period and input from said digitizer during a second time period and provide an output coupled to said master shift register, and further wherein said means for providing said coded interrogation signals comprises, a storage register having an input coupled to receive output from said master shift register and provide a stored output, and means for modulo-2 adding the output of said master shift register with said stored output to provide said coded interrogation signals.

18. The system of claim 12 wherein the means for providing said coded interrogation signals comprises, means for modulo-2 adding output from said master shift register with the coding output signals of said digitizer to provide said coded interrogation signals.

19. The system of claim 12 wherein said interrogating means further includes, a correspondence generator coupled to receive intelligence from said master shift register and provide a plurality of outputs and means for modulo-2 adding the outputs from said correspondence generator with the coding output signals of said digitizer to provide input to said master shift register as part of said first body of intelligence.

20. The system of claim 7 wherein said response limiter means includes, a first counting means responsive to said decoded interrogation signals for counting the number of correct coded interrogation signals received, and means for providing said coded reply signals when said first counting means reaches a predetermined count.

21. The system of claim 20 wherein said response limiter means further includes, a second counting means for counting the number of incorrectly coded interrogation signals received and reseting said first counting means when said second counting means reaches a predetermined count.

22. The system of claim 21 wherein said response limiter means further includes, a comparator means for comparing two correct interrogation signals, and means responsive to said comparator means for passing said coded reply signals to said second transceiver only when two correct received interrogation signals are different.

* * * * *